US008458853B2

(12) United States Patent
Charlton et al.

(10) Patent No.: US 8,458,853 B2
(45) Date of Patent: Jun. 11, 2013

(54) STEAM CLEANER INCLUDING A QUICK RELEASE COUPLING FOR A CLEANING TOOL

(75) Inventors: Christopher M. Charlton, Medina, OH (US); Phonesacksith G. Kettavong, Kent, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 0 days.

(21) Appl. No.: 13/398,373

(22) Filed: Feb. 16, 2012

(65) Prior Publication Data
US 2012/0204375 A1    Aug. 16, 2012

Related U.S. Application Data

(60) Provisional application No. 61/443,444, filed on Feb. 16, 2011, provisional application No. 61/449,878, filed on Mar. 7, 2011.

(51) Int. Cl.
*A47L 11/34* (2006.01)
*A47L 5/14* (2006.01)

(52) U.S. Cl.
USPC .................................. 15/321; 15/322; 15/403

(58) Field of Classification Search
USPC .......................................... 15/321, 322, 403
IPC ........................... A47L 11/34,11/40, 5/14, 9/02
See application file for complete search history.

(56) References Cited

U.S. PATENT DOCUMENTS

| 1,443,455 | A | 1/1923 | Bown |
| 2,440,143 | A | 4/1948 | Hammell |
| 2,832,612 | A | 4/1958 | Coutts |
| 2,941,822 | A | 6/1960 | Moecker |
| 3,262,718 | A | 7/1966 | Draudt |
| 3,351,359 | A | 11/1967 | Ferraris |
| 4,005,735 | A | 2/1977 | Miyamoto |
| 4,198,080 | A | 4/1980 | Carpenter |
| 5,332,266 | A | 7/1994 | Canale |
| 5,740,583 | A | 4/1998 | Shimada et al. |
| 6,435,754 | B1 | 8/2002 | Canale |
| 6,454,308 | B1 | 9/2002 | Kim |

(Continued)

FOREIGN PATENT DOCUMENTS

| GB | 765984 | 1/1957 |
| KR | 100838153 | 6/2008 |

OTHER PUBLICATIONS

International Search Report and Written Opinion for Application No. PCT/US2012/025428 dated Sep. 19, 2012 (7 pages).

*Primary Examiner* — David Redding
(74) *Attorney, Agent, or Firm* — Michael Best & Friedrich LLP

(57) ABSTRACT

A steam cleaner that includes a cleaning tool having a first cleaning surface configured to contact the surface being cleaned and a second cleaning surface configured to contact the surface being cleaned. The steam cleaner further includes a coupling operable to removably couple the cleaning tool and a conduit. The coupling includes a locking member movable from an engaged position to a disengaged position. The cleaning tool is coupled to the conduit for movement with the conduit when the locking member is in the engaged position and the cleaning tool is removable from the conduit when the locking member is in the disengaged position. The coupling further includes an actuator manually movable from a locked position to an unlocked position to move the locking member from the engaged position to the disengaged position, and a biasing member that biases the actuator toward the locked position.

20 Claims, 3 Drawing Sheets

U.S. PATENT DOCUMENTS

| | | |
|---|---|---|
| 6,474,696 B1 | 11/2002 | Canale |
| 6,494,492 B1 | 12/2002 | Ha |
| 6,513,191 B1 | 2/2003 | Kim |
| 6,612,617 B2 | 9/2003 | Xu |
| 6,634,674 B1 | 10/2003 | Xu |
| 6,893,050 B2 | 5/2005 | Schiemann et al. |
| 6,951,439 B2 | 10/2005 | Arich |
| 7,025,383 B2 | 4/2006 | Canale |
| 7,178,515 B2 | 2/2007 | Carpenter et al. |
| 7,418,958 B2 | 9/2008 | Carpenter et al. |
| 7,431,027 B2 | 10/2008 | Carpenter et al. |
| 7,661,725 B2 | 2/2010 | Kouda |
| 2002/0144374 A1 | 10/2002 | Tsen |
| 2004/0111822 A1 | 6/2004 | Syu |
| 2009/0289449 A1 | 11/2009 | Hasunuma et al. |
| 2010/0001511 A1 | 1/2010 | Canale |
| 2010/0269287 A1 | 10/2010 | Vrdoljak et al. |
| 2010/0306960 A1 | 12/2010 | Jonsson et al. |
| 2010/0320747 A1 | 12/2010 | Takahashi |

STEAM CLEANER INCLUDING A QUICK RELEASE COUPLING FOR A CLEANING TOOL

CROSS REFERENCE TO RELATED APPLICATIONS

This application claims priority to U.S. Provisional Patent Application No. 61/443,444, filed Feb. 16, 2011 and to U.S. Provisional Patent Application No. 61/449,878, filed Mar. 7, 2011, the entire contents of which are both hereby incorporated herein by reference.

BACKGROUND

The present invention relates to steam cleaners. Steam cleaners can be used to clean surfaces, such as tables, counters, shower walls, shower doors or fabrics, such as upholstery or draperies. Steam cleaners typically include a supply tank, a heater, and a cleaning tool that is attached to the supply tank by a hose. The heater, which can be electrical, heats cleaning fluid in the supply tank to generate a vaporized cleaning fluid. The vaporized cleaning fluid travels through the hose and the cleaning tool and is discharged on the surface or fabric to clean the surface or fabric.

SUMMARY

In one embodiment, the invention provides a steam cleaner operable to clean a surface. The steam cleaner includes a supply tank configured to retain a cleaning fluid, a heater operable to heat the cleaning fluid to vaporize the cleaning fluid and generate a vaporized cleaning fluid, a conduit in fluid communication with the supply tank, and a cleaning tool in fluid communication with the conduit. The cleaning tool includes a permeable portion that allows the vaporized cleaning fluid to pass through the cleaning tool to clean the surface, a first cleaning surface configured to contact the surface being cleaned, and a second cleaning surface configured to contact the surface being cleaned. The steam cleaner further includes a coupling operable to removably couple the cleaning tool and the conduit. The coupling includes a locking member movable from an engaged position to a disengaged position. The cleaning tool is coupled to the conduit for movement with the conduit when the locking member is in the engaged position and the cleaning tool is removable from the conduit when the locking member is in the disengaged position. The coupling further includes an actuator manually movable from a locked position to an unlocked position to move the locking member from the engaged position to the disengaged position, and a biasing member that biases the actuator toward the locked position.

In another embodiment the invention provides a steam cleaner operable to clean a surface. The steam cleaner includes a supply tank configured to retain a cleaning fluid, a heater operable to heat the cleaning fluid to vaporize the cleaning fluid and generate a vaporized cleaning fluid, a conduit in fluid communication with the supply tank, a cleaning tool including a cleaning pad and a frame that supports the cleaning pad in fluid communication with the conduit, and a coupling operable to removably couple the cleaning tool and the conduit. The coupling includes a locking member movable from an engaged position to a disengaged position. The cleaning tool is coupled to the conduit for movement with the conduit when the locking member is in the engaged position and the cleaning tool is removable from the conduit when the locking member is in the disengaged position. The coupling further includes an actuator manually movable from a locked position to an unlocked position to move the locking member from the engaged position to the disengaged position, and a biasing member that biases the actuator toward the locked position. The frame includes a frame projection received within the conduit and engaged by the locking member to couple the cleaning tool to the conduit.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
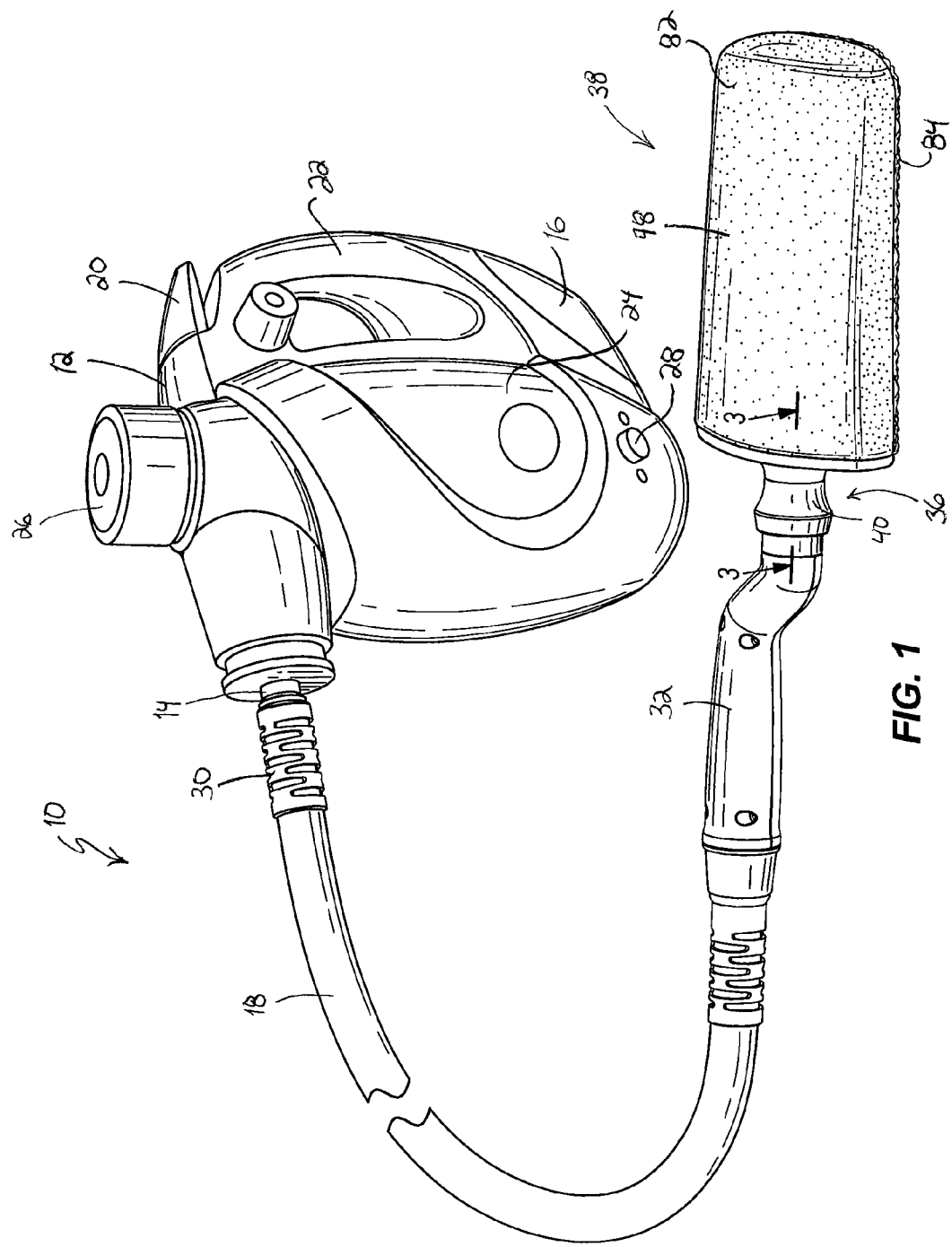
FIG. 1 is a perspective view of a steam cleaner according to one embodiment of the invention.

FIG. 1 illustrates a steam cleaner 10 that includes a housing 12, a nozzle 14, a first cleaning fluid supply tank 16, and a conduit 18. The housing 12 includes a trigger 20 and a handle 22. The nozzle 14 is mounted to the housing 12 and is adapted to receive the conduit 18, which is a hose in the illustrated embodiment, or other cleaning attachment. In one embodiment, the first supply tank 16 is filled with a cleaning fluid or other solution and may be removably mounted to the housing 12. Water is stored inside a fluid heating vessel, or a second cleaning fluid supply tank 24. A fill cap 26 is removably attached to the housing 12 and covers a fill opening that provides access to and allows a user to pour water into the fluid heating vessel 24, which includes a heater 28. A steam conduit fluidly connects the fluid heating vessel 24 to the nozzle 14 and a solution conduit fluidly connects the solution tank 16 to the steam conduit.

A housing end 30 of the hose 18 is removably connected to the nozzle 14. The fluid heating vessel 24 heats water contained within the vessel 24 to vaporize the water and create steam. The trigger 20 mechanically connects to a spring biased, normally closed valve. The valve is fluidly connected to the fluid heating vessel 24 and the steam conduit that leads to the nozzle 14 of the steam cleaner 10. In operation, pressing the trigger 20 causes the valve to open. Once the valve is open, the pressure differential between the pressure within the fluid heating vessel 24 and the ambient pressure of the external environment at the nozzle 14 causes steam to flow from the fluid heating vessel 24, through the valve and steam conduit, to the nozzle 14. Steam exiting through the steam conduit and nozzle draws the solution from the solution conduit via a venturi effect.

Figure 3:
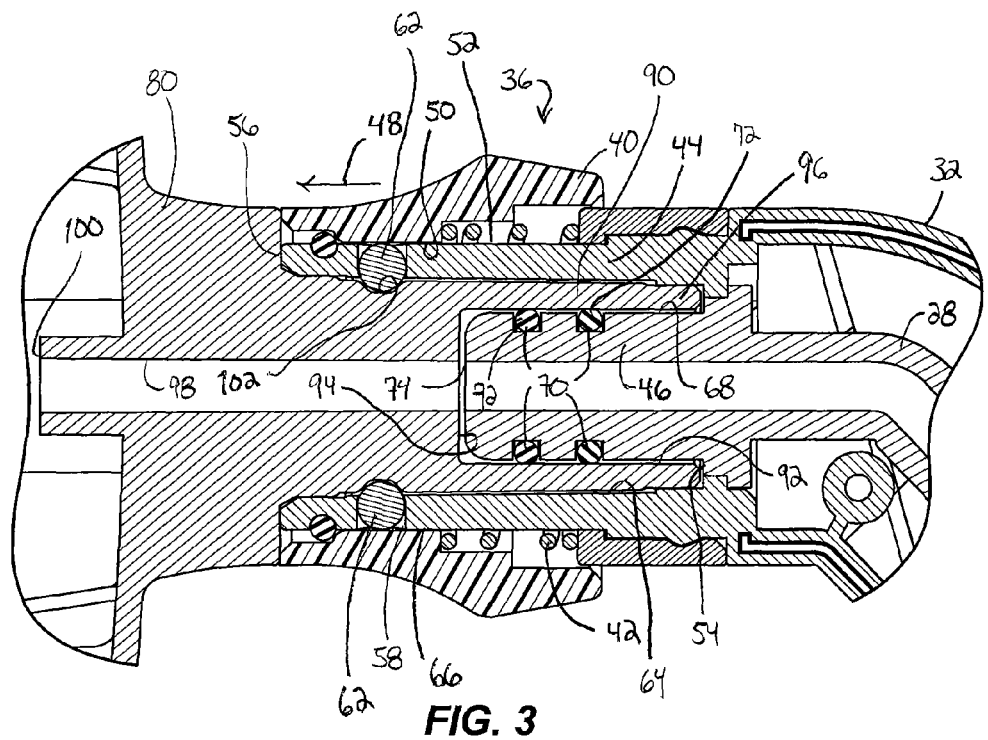
FIG. 3 is a cross-sectional view of the coupling of FIG. 2 taken along line 3-3 of FIG. 1.
Figure 4:
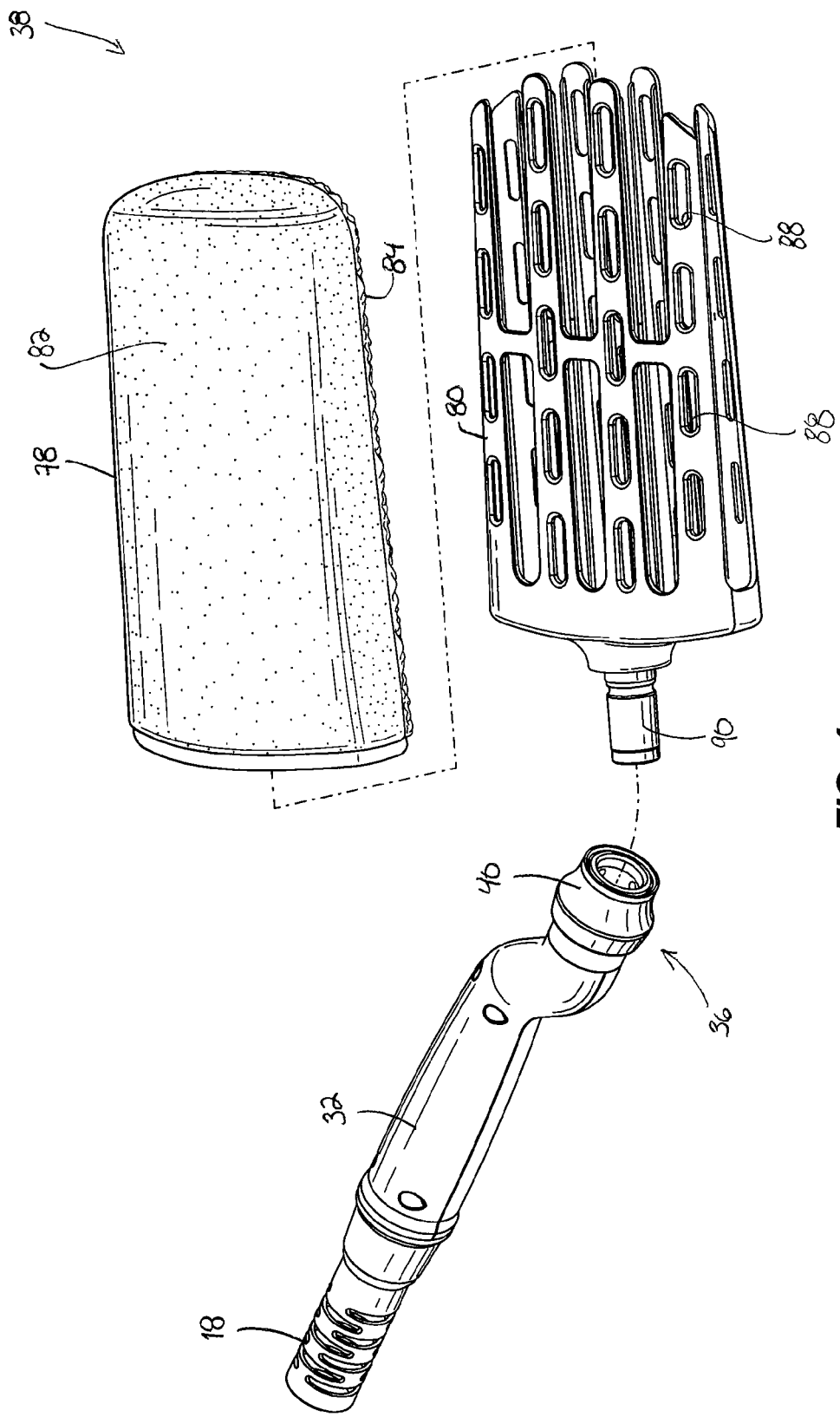
FIG. 4 is an exploded view of a cleaning tool of the steam cleaner of FIG. 1.

Opposite the housing end 30, the hose 18 terminates at a hose handle 32 as shown in FIGS. 1 and 4. An internal hose conduit 28 (FIG. 3) for transporting the cleaning fluid, a mixture of steam and solution in one embodiment, extends from the housing end 30 and through the hose 18 and the hose handle 32. The hose handle 32 includes a coupling 36, which is a quick release coupling in the illustrated embodiment. The quick release coupling 36 is configured to receive a variety of steam cleaning tool attachments 38, one of which is illustrated in FIGS. 1 and 4. In other embodiments, the steam cleaner does not include a hose and the coupling 36 is included on the nozzle 14 of the steam cleaner.

Figure 2:
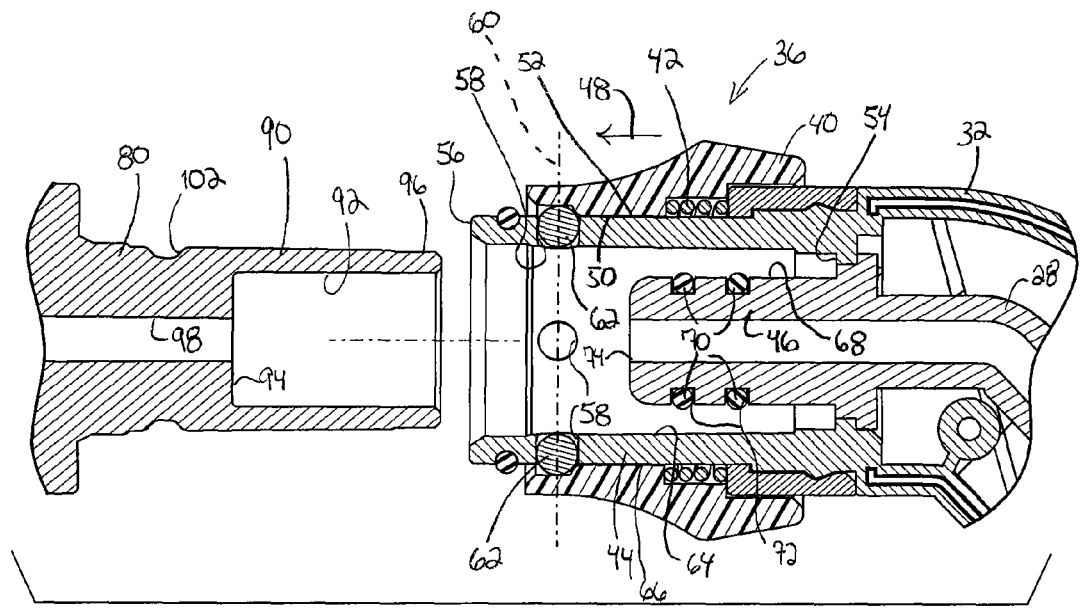
FIG. 2 is a partially exploded cross-sectional view of a coupling of the steam cleaner of FIG. 1 taken along line 3-3 of FIG. 1.

Referring to FIGS. 2-3, the coupling 36 includes an actuator 40, a biasing member 42, a neck 44, and an inner male projection 46. The actuator 40, which is a sliding collar in the illustrated embodiment, is biased away from the hose handle 32, in the direction of arrow 48, in an axial direction by the biasing member 42, which is a coil spring in the illustrated embodiment. The collar 40 includes a contact edge 50 that is in contact with the neck 44 at all times around an outer edge 52 of the neck 44. The collar 40 has a larger diameter than and is concentric to the neck 44. The neck 44 has a base 54, an open end 56, and a plurality of pockets 58 in a radial connection plane 60. Each pocket 58 extends through the wall of the neck 44 such that each pocket 58 forms an aperture. Each of the illustrated pockets 58 includes a locking member 62, which is a ball in the illustrated embodiment. The balls 62 each have a diameter that is larger than the width of the neck 44 such that a portion of each ball 62 extends radially beyond either an inner edge 64 or outer edge 66 of the neck 44. As shown in FIG. 3, when the collar 40 is in a locked position, the contact edge 50 forces the balls 62 to extend radially inward past the inner edge 64 of the neck 44.

The interior of the neck 44 is generally hollow. The male projection 46 includes an outer edge 68 and in one embodiment, the male projection 46 is positioned within the generally hollow region of the neck 44. The male projection 46 has a smaller diameter than and is concentric to the neck 44. The male projection 46 includes seals 70, which are o-ring gaskets in the illustrated embodiment, disposed within one or more channels 72 on its outer edge 68. The male projection 46 fluidly connects intermediary conduit 28 and contains an aperture 74 to continue the flow of the cleaning fluid. In the illustrated embodiment, the male projection 46 does not extend past the open end 56 of the neck 44 in the axial direction. In another embodiment, the male projection 46 extends past the open end 56 of the neck 44. The base 54 of the neck 44 is disposed between the outer edge 68 of the male projection 46 and the inner edge 64 of the neck 44.

Referring to FIGS. 3 and 4, the cleaning tool 38 includes a cleaning pad 78 and a frame 80 that is received within the cleaning pad 78 to support the cleaning pad 78. The cleaning pad 78 includes a first cleaning surface 82 and a second cleaning surface 84 directly opposed to the first cleaning surface 82. The first cleaning surface 82 is permeable such that the vaporized cleaning fluid can permeate through the cleaning surface 82. In one embodiment, the cleaning surface 82 is formed by a micro-fiber cloth. The second cleaning surface 84 is formed from a different material than the first cleaning surface 82 such that the second cleaning surface 84 has a different texture than the first cleaning surface 82 to provide a user with a different cleaning function. For example, in one embodiment, the second cleaning surface 84 can be formed from an impermeable rubber pad that can be used to scrub a surface. The cleaning pad 78 is removably coupled to the frame 80 (e.g., the user can slide the pad 78 off of the frame 80) so that the user can replace the pad 78 when it is worn or if the user desires to use a different cleaning pad.

The frame 80 includes apertures 88 that allow the vaporized cleaning fluid to travel through the frame 80 to contact the cleaning pad 78. The frame 80 further includes a projection or nipple 90. The nipple 90 includes a hollow chamber 92, an inner base 94, a circumferential edge 96, and a delivery conduit 98 that extends from the inner base 94 to a steam and solution dispensing port 100 of the cleaning tool 38. As shown in FIG. 3, when the male projection 46 is fully inserted into the hollow chamber 92 of the nipple 90, the aperture 74 of the male projection 46 contacts the inner base 94 to deliver the cleaning fluid through the delivery conduit 98 and to the dispensing port 100 of the cleaning tool 38. The circumferential edge 96 of the nipple 90 is concentric to the neck 44 and is sized to fit within and against the inner edge 64 of the neck 44. The cleaning tool 38 has a circumferential groove or recess 102 between the inner base 94 of the nipple 90 and the dispensing port 100 of the cleaning tool 38 that extends around the projection 90 and is suited to receive the balls 62, which allows the cleaning tool 38 to rotate with respect to the conduit 18 when the cleaning tool 38 is attached to the conduit 18.

In operation, a user pulls the collar 40 in a direction opposite the arrow 48 to move the collar 40 from the locked position (FIG. 3) to an unlocked position (FIG. 2), which allows the user to uncouple the tool 38 from the conduit 18. As the collar 40 slides in this direction, the contact edge 50 slides away from the connection plane 60, thus freeing the balls 62 to move radially outward from an engaged position (FIG. 3) to a disengaged position (FIG. 2) where the balls 62 extend past the outer edge 66 of the neck 44. Holding the collar 40 in the unlocked position (FIG. 2), a user then inserts the nipple 90 of the tool 38 into the neck 44 as shown in FIG. 3. The circumferential edge 96 of the nipple 90 is free to slide along the inner edge 64 of the neck 44 and past the pockets 58 of the neck 44. The nipple 90 is then fully inserted into the neck 44, until the circumferential edge 96 of the nipple 90 contacts the base 54 of the neck 44 and fits between the inner edge 64 of the neck 44 and the outer edge 68 of the male projection 46. The seals 70 interface with the circumferential edge 96 of the nipple 90 to create a seal. Therefore, the aperture 74 of the male projection 46 fluidly and sealingly connects to the inner base 54 and delivery conduit 98 of the nipple 90.

Once the male projection 46 has mated with the nipple 90, a user releases the collar 40. The spring 42 pushes the collar 40 back toward the locked position (i.e., in the direction of arrow 48) until the contact edge 50 comes to rest in the connection plane 60. As the contact edge 50 slides over each pocket 58 in the connection plane 60, each respective ball 62 is forced by the contact edge 50 to extend radially inward past the inner edge 64 of the neck 44 and into the circumferential groove 102 of the cleaning tool 38. The cleaning tool 38 is now securely connected to the hose handle 32, and the tool 38 is locked in an axial position as shown in FIG. 1. Rotational movement of the tool 38 is still permitted with respect to the hose handle 32 because the circumferential groove 102 is extends around the projection 90.

Various features of the invention are set forth in the following claims.

What is claimed is:

1. A steam cleaner operable to clean a surface, the steam cleaner comprising:
a supply tank configured to retain a cleaning fluid;
a heater operable to heat the cleaning fluid to vaporize the cleaning fluid and generate a vaporized cleaning fluid;
a conduit in fluid communication with the supply tank;
a cleaning tool in fluid communication with the conduit, the cleaning tool including
a permeable portion that allows the vaporized cleaning fluid to pass through the cleaning tool to clean the surface,
a first cleaning surface configured to contact the surface being cleaned, and a second cleaning surface configured to contact the surface being cleaned; and a coupling operable to removably couple the cleaning tool and the conduit, the coupling including,
- a locking member movable from an engaged position to a disengaged position, the cleaning tool coupled to the conduit for movement with the conduit when the locking member is in the engaged position and the cleaning tool is removable from the conduit when the locking member is in the disengaged position,
- an actuator manually movable from a locked position to an unlocked position to move the locking member from the engaged position to the disengaged position, and
- a biasing member that biases the actuator toward the locked position.

2. The steam cleaner of claim 1, wherein the cleaning tool includes a frame and a cleaning pad that includes the permeable portion and the first and second cleaning surfaces.

3. The steam cleaner of claim 2, wherein the frame is received within the cleaning pad such that the cleaning pad surrounds the frame.

4. The steam cleaner of claim 2, wherein the frame includes a plurality of apertures through which the vaporized cleaning fluid can flow to permeate the permeable portion of the cleaning pad.

5. The steam cleaner of claim 2, wherein the cleaning pad is removably coupled to the frame to allow the cleaning pad to be replaced with a second cleaning pad.

6. The steam cleaner of claim 2, wherein the frame includes a frame projection received within the conduit and engaged by the locking member to couple the cleaning tool to the conduit.

7. The steam cleaner of claim 6, wherein the frame projection includes an aperture that extends through the frame in fluid communication with the conduit to provide the vaporized cleaning fluid to the cleaning pad when the frame is coupled to the conduit via the coupling.

8. The steam cleaner of claim 7, wherein the conduit includes a conduit projection received within the aperture of the frame projection.

9. The steam cleaner of claim 8, further comprising a seal that extends around an exterior surface of the conduit projection to seal against an interior surface of the frame projection when the cleaning tool is coupled to the conduit.

10. The steam cleaner of claim 1, wherein the first cleaning surface includes the permeable portion of the cleaning pad.

11. The steam cleaner of claim 10, wherein the second cleaning surface is generally impermeable by the vaporized cleaning fluid.

12. The steam cleaner of claim 1, wherein the first cleaning surface has a first texture, and wherein the second cleaning surface has a second texture, different than the first texture.

13. The steam cleaner of claim 12, wherein the first cleaning surface includes a micro-fiber cloth.

14. The steam cleaner of claim 1, wherein the first cleaning surface faces a first direction, and wherein the second cleaning surface faces a second direction that is directly opposed to the first direction.

15. The steam cleaner of claim 1, wherein the cleaning tool is rotatable with respect to the conduit when the locking member is in the engaged position and the cleaning tool is coupled to the conduit.

16. A steam cleaner operable to clean a surface, the steam cleaner comprising:
- a supply tank configured to retain a cleaning fluid;
- a heater operable to heat the cleaning fluid to vaporize the cleaning fluid and generate a vaporized cleaning fluid;
- a conduit in fluid communication with the supply tank;
- a cleaning tool including a cleaning pad and a frame that supports the cleaning pad in fluid communication with the conduit; and
- a coupling operable to removably couple the cleaning tool and the conduit, the coupling including,
  - a locking member movable from an engaged position to a disengaged position, the cleaning tool coupled to the conduit for movement with the conduit when the locking member is in the engaged position and the cleaning tool is removable from the conduit when the locking member is in the disengaged position,
  - an actuator manually movable from a locked position to an unlocked position to move the locking member from the engaged position to the disengaged position, and
  - a biasing member that biases the actuator toward the locked position,
- wherein the frame includes a frame projection received within the conduit and engaged by the locking member to couple the cleaning tool to the conduit.

17. The steam cleaner of claim 16, wherein the frame projection includes an aperture that extends through the frame in fluid communication with the conduit to provide the vaporized cleaning fluid to the cleaning pad when the frame is coupled to the conduit via the coupling.

18. The steam cleaner of claim 17, wherein the conduit includes a conduit projection received within the aperture of the frame projection.

19. The steam cleaner of claim 18, further comprising a seal that extends around an exterior surface of the conduit projection to seal against an interior surface of the frame projection when the cleaning tool is coupled to the conduit.

20. The steam cleaner of claim 16, further comprising a groove that extends around the frame projection, and wherein the locking member is received in the groove and allows rotation of the frame relative to the conduit when the locking member is in the engaged position and the cleaning tool is coupled to the conduit.

* * * * *